United States Patent
Van Der Plas

(10) Patent No.: US 7,153,020 B2
(45) Date of Patent: Dec. 26, 2006

(54) MIXER WAGON

(75) Inventor: Nicolaas Van Der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 307 days.

(21) Appl. No.: 10/939,322

(22) Filed: Sep. 9, 2004

(65) Prior Publication Data

US 2005/0058017 A1    Mar. 17, 2005

(30) Foreign Application Priority Data

Sep. 9, 2003    (DE)    ............... 203 14 002 U

(51) Int. Cl.
*B01F 15/02* (2006.01)
*B01F 7/24* (2006.01)

(52) U.S. Cl. .............. 366/193; 366/314; 366/603

(58) Field of Classification Search ........ 366/192, 366/193, 196, 314, 318, 603; 241/101.76, 241/101.761, 101.8, 260.1, 605
See application file for complete search history.

(56) References Cited

U.S. PATENT DOCUMENTS

| | | | |
|---|---|---|---|
| 5,154,510 A * | 10/1992 | Faccia | ............ 366/193 |
| 5,456,416 A | 10/1995 | Hartwig | |
| 5,601,362 A | 2/1997 | Schuler | |
| 6,929,394 B1 * | 8/2005 | Tamminga | ............ 366/603 |
| 6,969,191 B1 * | 11/2005 | Tamminga | ......... 241/101.761 |
| 2005/0047273 A1 * | 3/2005 | Albright et al. | ............ 366/314 |
| 2005/0058017 A1 * | 3/2005 | Van Der Plas | ............ 366/193 |
| 2005/0094488 A1 * | 5/2005 | Van Der Plas | ............ 366/603 |
| 2005/0105390 A1 * | 5/2005 | Albright | ............ 366/314 |

FOREIGN PATENT DOCUMENTS

| | | |
|---|---|---|
| DE | 298 20 836 U1 | 5/2000 |
| EP | 1 084 612 A1 | 3/2001 |
| EP | 1537777 A1 * | 6/2005 |

* cited by examiner

*Primary Examiner*—Charles E. Cooley
(74) *Attorney, Agent, or Firm*—Darby & Darby

(57) ABSTRACT

A mixer wagon includes a mixing chamber having a bottom, a fill opening larger than the bottom, and a wall. A work tool is provided in the mixing chamber for sweeping over a work area on the bottom. The wall is provided at its side with a flattening defined by curved portions, the flattening having assigned thereto a discharge opening which is closable by a slide. The flattening encloses with the mixing chamber bottom a first inclination angle that is smaller than a second inclination angle enclosed by the curved portion with the bottom. A comfortable lateral discharge of the fodder is combined with a thorough mixing by providing that in the vicinity of the bottom the slide and the curved portion of the wall on the discharge opening follows the shape of the circumference of the work area, and the opening and closing path P extend at an angle that is substantially equal to or larger than the larger inclination angle.

14 Claims, 6 Drawing Sheets

MIXER WAGON

FIELD OF THE INVENTION

The present invention relates to a mixer wagon, such as for agricultural products.

BACKGROUND OF THE INVENTION

Mixer wagons are used in agriculture for mixing, transporting and discharging fodder and are on the market in great numbers. For instance, DE 298 20 836 01 shows a mixer wagon of the generic type which includes a chassis to be towed by a tractor, on which a container is arranged with a mixing chamber. The mixing chamber has a bottom resting on the chassis, an upper fill opening, and a wall extending from the bottom upwards. The interior of the mixing chamber has arranged therein a work tool. There usually is a mixing screw which rotates about a vertical axis and tapers from the bottom to the top. The mixing screw sweeps over a circular work area provided on the bottom, which is relatively small in most cases.

For increasing the capacity as much as possible, the wall extends obliquely upwards, so that the fill opening is larger than the bottom. On the other hand, a mixer wagon must not protrude too much in a direction transverse to the direction of travel in order to fit through the feeding alley or passage without getting caught. It has, therefore, turned out to be useful to provide the wall of the mixing chamber at the sides with a flattening extending in the vertical direction so that essentially only the front and rear portions of the wall extend in conical fashion. The flattening is so wide in the known mixer wagon in the direction of travel that it can accommodate the whole discharge opening for laterally discharging the fodder.

The discharge opening is closed by means of a slide which is movable in parallel with the direction of travel through an actuator. The actuator includes a horizontally arranged piston-cylinder unit which acts on the lateral edge of the slide. However, since the wall at this point already extends in curved fashion, the piston-cylinder unit projects forward, which evokes the risk of damage or accidents. Moreover, such a large flattening which is capable of accommodating the whole discharge opening is bound to extend in tangential direction relative to the circumference of the work area. This requires a bottom which at least at both sides of the discharge opening is larger than the work area, which is bound to create so-called "dead" corners, i.e., areas outside the work circle of the mixing screw in which fodder remains.

EP 1 084 612 A discloses a mixer wagon with vertically curved side walls and a lateral discharge opening which, however, must be covered by a gate. U.S. Pat. No. 5,456,415 discloses a mixer wagon having conical curved side walls in which the discharge opening is oriented obliquely forward.

It is, therefore, the object of the present invention to provide a mixer wagon which overcomes the drawbacks of the prior art and combines, in particular, a comfortable lateral discharge of fodder with a thorough mixing.

BRIEF DESCRIPTION OF THE INVENTION

In a preferred embodiment of the invention, the advantages of laterally flattened walls and a laterally arranged discharge opening can be combined without the risk of injury or damage and without any adverse affect on the mixing result that is due to the constructional conditions. The slide and the areas of the wall laterally extending therefrom are adapted to the shape of the work area of the work tool, dead corners are avoided. Nevertheless, the slide can be opened without jamming if its opening and closing path is allowed to extend substantially at the angle of inclination at which the all portions next to the flattening and the discharge opening, respectively, extend.

When the actuating mechanism is arranged such that the direction of inclination also follows the increased inclination, a linear actuating mechanism, such as piston-cylinder units, can be used without any problems.

Expediently, the piston-cylinder unit is arranged at a place of the wall that extends at the larger angle of inclination, so that the opening and closing path is automatically obtained without the need for taking measures to bridge the gap between the upper edge of the slide and the flattening of the wall, the gap increasing more and more when the slide is shifted upwards.

Piston-cylinder units, e.g., in the form of a master slave cylinder set, which are to be actuated jointly are particularly preferred because there is no risk that the slide gets jammed.

A further preferred embodiment of an actuating mechanism encompasses a single piston-cylinder unit which acts on the slide via a transmission arranged, preferably a double-armed pivot lever.

BRIEF DESCRIPTION OF THE DRAWINGS

Embodiments of the present invention will now be explained in more detail with reference to the drawings, in which.

DETAILED DESCRIPTION OF THE INVENTION

Figure 1:
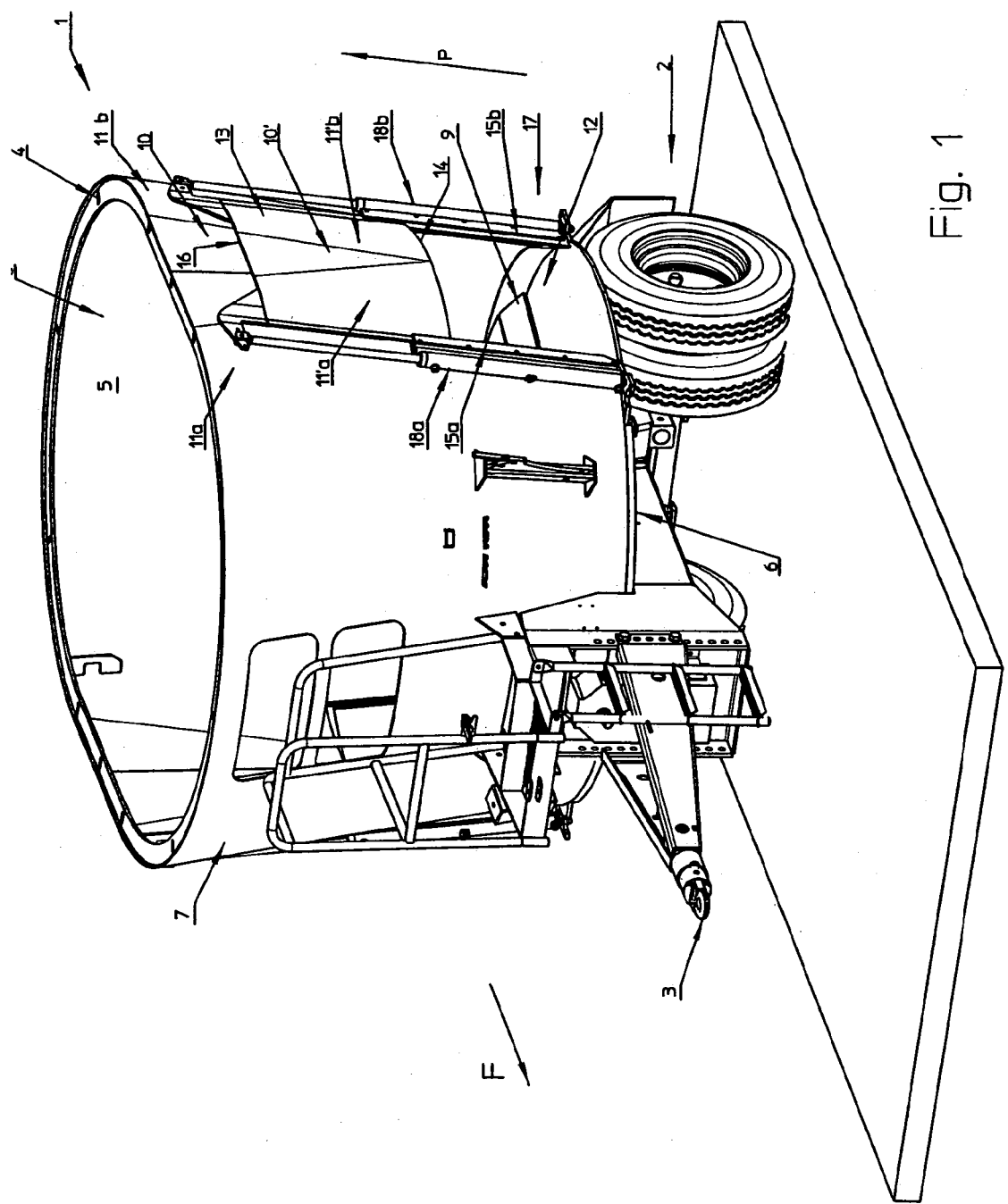
FIG. 1 shows a schematic perspective view of a first embodiment of a mixer wagon of the invention.

FIGS. 1–5 are schematic illustrations showing a first embodiment of a mixer wagon 1 for fodder, the wagon being equipped in the standard way with a chassis 2, which can be hitched via a coupler 3 to a tractor or a similar tow vehicle and can be moved with the help thereof in the feeding alley or along a feeding passage in travel direction F.

The mixer wagon 1 includes a mixing container 4 which encloses a mixing chamber 5. The mixing container 4 includes a bottom 6 and a wall 7 which extends upwards from the bottom 6 and leaves open a fill opening 8 through which fodder is filled into the mixing chamber 5.

A work tool 9 is provided in the interior of the mixing chamber 5 for mixing and discharging fodder. The work tool 9 is preferably a mixing screw which during movement of the mixer wagon 1 is rotatingly driven about a vertical axis and comprises a spiral which is upwardly decreasing in size. Hence, the work tool 9 sweeps over a circular work area A on the bottom 6. To mix substantially the whole fodder in a thorough manner, the bottom 6 is also adapted in its size and shape to the work area, i.e., the bottom 6 is essentially circular and equal to, or slightly larger than, the work area A. Since the work tool 9 must only be so large that it achieves an optimum mixing result, the capacity of the mixing chamber 5 is enlarged in that the wall 7 can extend conically upwards to the outside, so that the fill opening 8 is larger than the bottom 6. However, to avoid an excessive increase in the width of the mixing container 4 and the mixer wagon 1, the wall 7 includes a flattening 10, in symmetry at both sides of the container 4 and diametrically opposite in a direction transverse to the direction of travel F. In the illustrated embodiment, the flattening 10 is a substantially triangular flat or flat-curved portion that extends from the fill opening 8 to the bottom 6, but touches the bottom essentially only at a point and in tangential fashion. At both sides of flattening 10, there are curved portions 11a and 11b of the wall 7. The flattening 10 may be both entirely planar or curved, but then with a radius of curvature that is considerably larger than the radius of curvature of the curved portions 10a, 10b.

Figure 3:
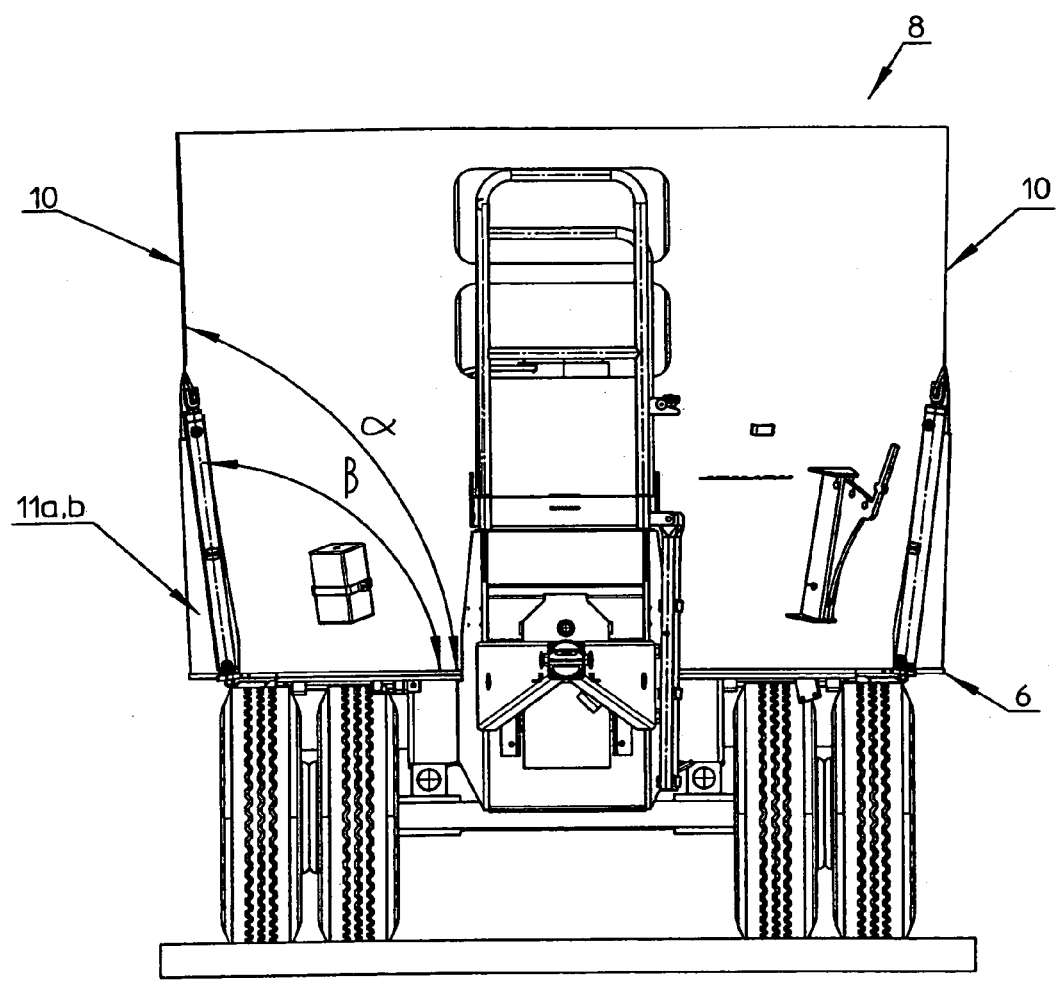
FIG. 3 shows a front view of the mixer wagon according to FIG. 1, viewed in a direction opposite to the direction of travel.
Figure 4:
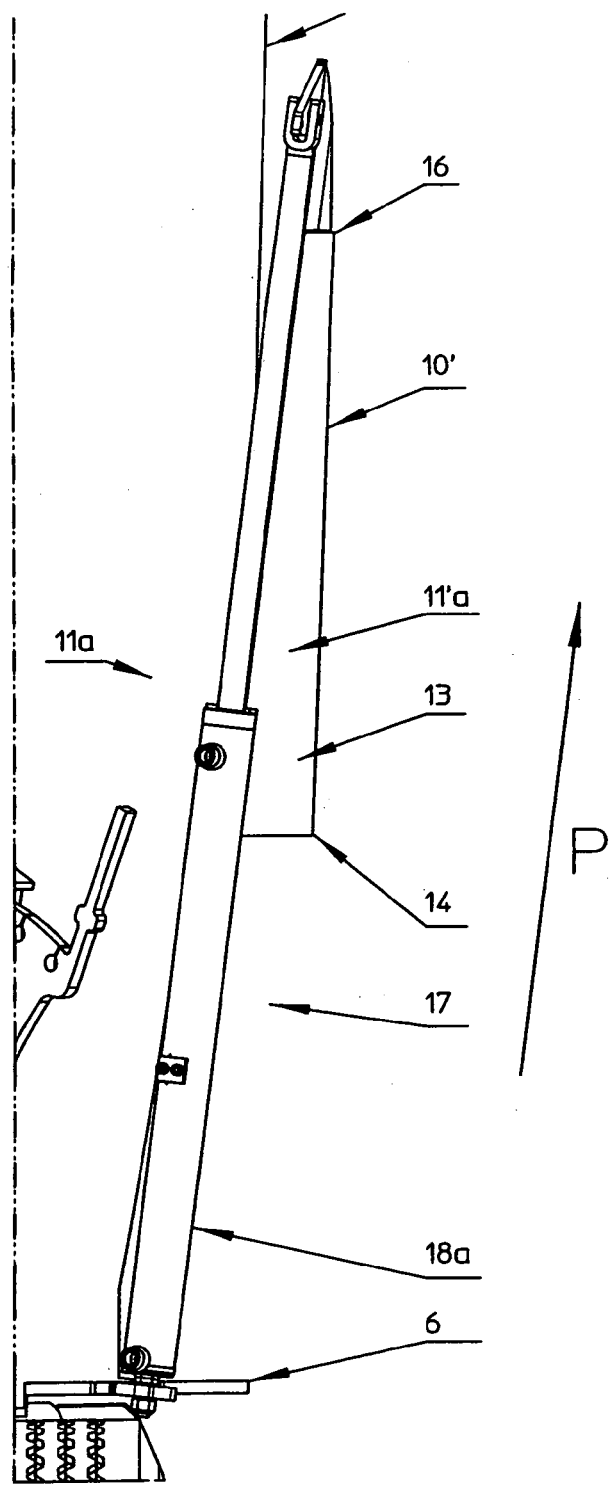
FIG. 4 shows a detail of the mixer wagon according to FIG. 3 on an enlarged scale.
Figure 5:
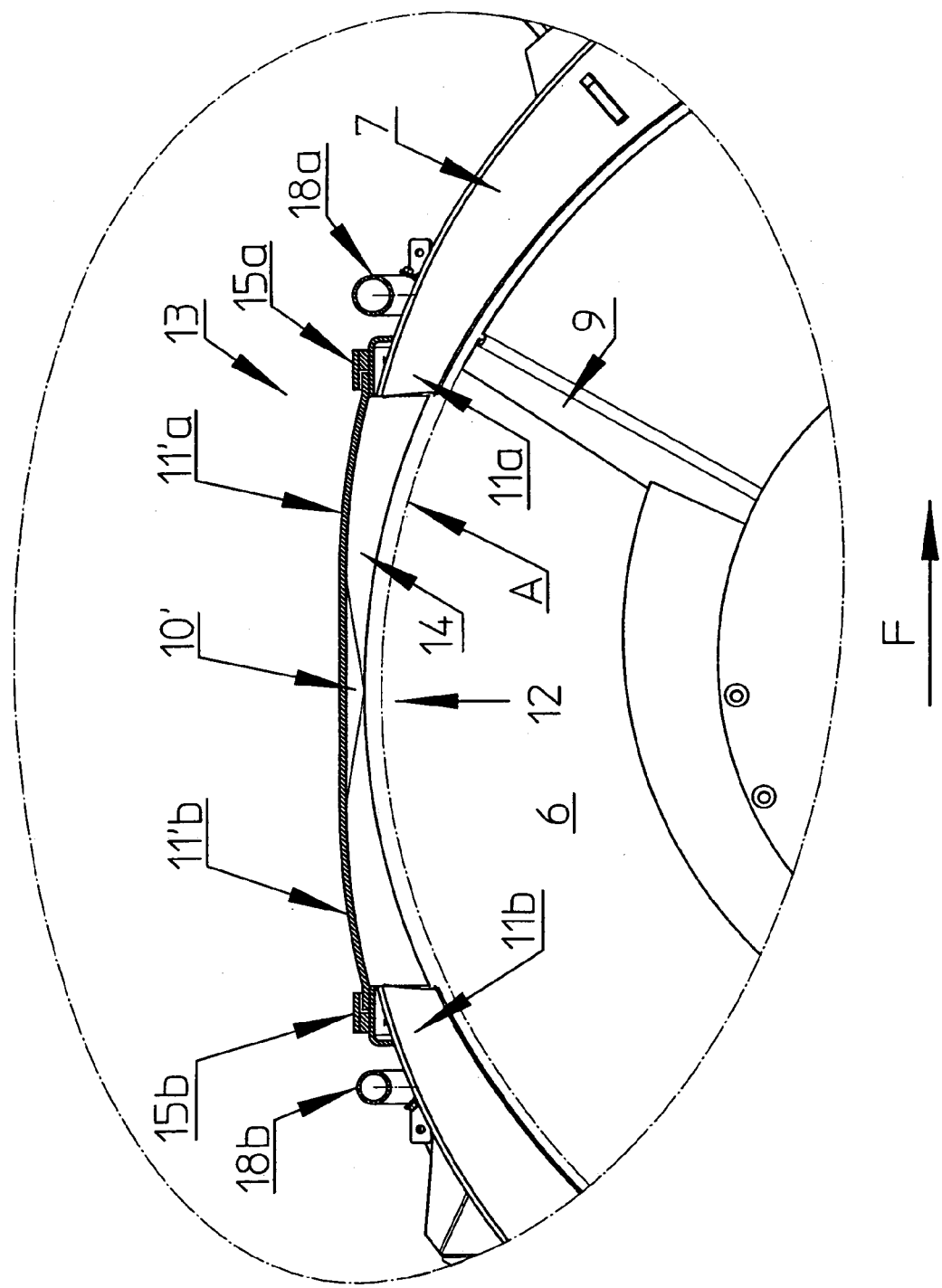
FIG. 5 shows a top view on the mixer wagon according to FIG. 1 in a cut and enlarged partial illustration.

As can be particularly seen in FIG. 3, the flattening 10 encloses an inclination angle α with the bottom 6 that is smaller than a second larger inclination angle β enclosed by the curved portions 11a, 11b with the bottom 6, the second inclination angle β may here increase with an increasing distance from the flattening 10 in a circumferential direction either continuously or in steps. Preferably, the inclination angle α is about 90°, i.e., the flattening 10 is approximately perpendicular to the bottom 6. However, the inclination angle α may also amount up to 98°, but is always smaller than inclination angle β.

The wall 7 of the mixer wagon 1 is provided on at least one side, preferably on both sides, with a discharge opening 12. The discharge opening 12 is provided in the lower area of the wall 7, preferably adjoining the bottom 6 without a threshold. In the illustrated embodiment, the discharge opening 12 is rectangular and extends in symmetry at both sides of the flattening 10 into the curved portions 11a, 11b. The discharge opening 12 can be closed by a slide 13 which is adapted in shape and size to the discharge opening 12 and corresponds essentially in shape and size to that piece of the wall 7 that has been removed for forming the discharge opening 12. Hence, the slide 13 contains a piece 10' of the flattening 10 and pieces 11'a and 11'b of the curved portions 11a, 11b.

The slide 13 comprises a bottom edge 14 on which the slide 13 is adapted to the shape of the circumference of the work circle of the work tool 9, i.e., the lower edge 14 is curved in the manner of a circular arc about the axis of rotation of the work tool 9. Likewise, the curved portions 11a, 11b, which are positioned at both sides of the discharge opening 12, are adapted near the bottom 6 to the circumference of the work surface. With an increasing distance from the bottom 6 and the discharge opening 12, respectively, such an adaptation to the shape of the work area is no longer needed, so that the radius of curvature or the inclination of the wall can be optimized with respect to increased capacity, particularly enlarged, as is shown by way of example in FIG. 5.

The slide 13 is accommodated with its lateral edges in guides in the form of guide rails 15a, 15b arranged at both sides of the discharge opening 12 on the curved portions 11a, 11b that extend at the larger inclination angle β which is present at both sides of the discharge opening 12 and opposite to the side edges of the slide 13, respectively.

This creates an opening and closing path P essentially extending at the larger inclination angle β, via which the slide can be moved in unhindered fashion for opening and closing the discharge opening 12. The upper edge 16 thereof is moving in this process at a more and more increasing lateral distance relative to the flattening 10 without the lateral protrusion of the mixer wagon 1 getting disproportionately large, as shown by way of example in FIG. 4.

The slide 13 is moved by an actuating means 17 which preferably includes at least one piston-cylinder unit. In the first embodiment according to FIGS. 1 to 5, the actuating means 17 includes two jointly operable piston-cylinder units 18a and 18b that are arranged in parallel with the guides 15a and 15b, i.e., they have an actuation direction which also extends at the inclination angle β. The piston-cylinder units 18a, 18b are positioned with their cylinders next to the discharge opening 12 and, with their piston rods, they engage the upper edge 16 of the slide 13.

Figure 2:
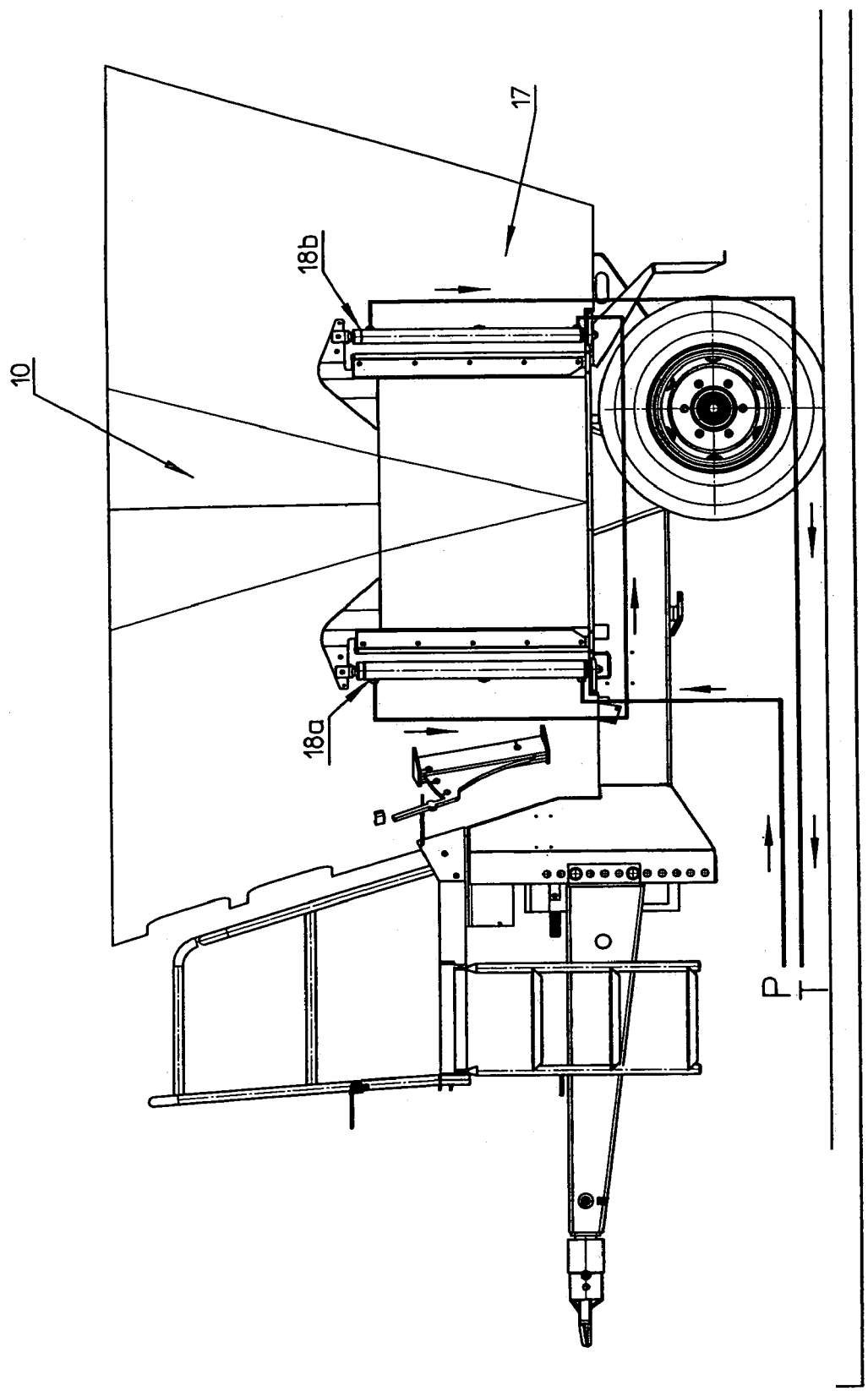
FIG. 2 shows a side view of the mixer wagon according to FIG. 1.

Preferably, a master-slave cylinder set is used that, as shown in FIG. 2, is actuated in dependence, with the piston-cylinder unit 18a taking over the actuation of the piston-cylinder unit 18b. It is thereby prevented that e.g., the slide is pressed in oblique direction during the closing operation when fodder passes e.g., into the guide rail or underneath the slide.

Figure 6:
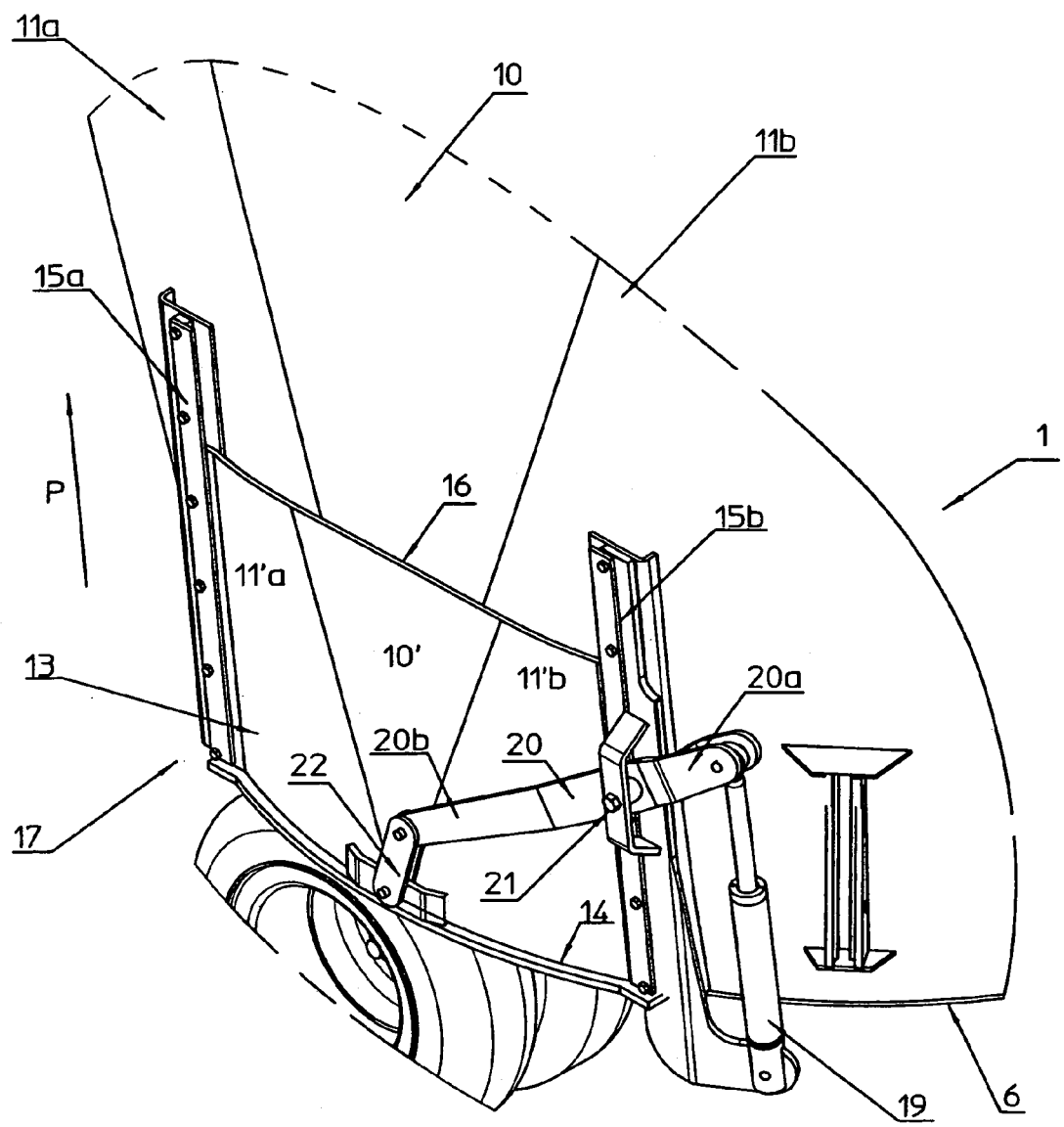
FIG. 6 shows a schematic perspective partial view of a second embodiment of a mixer wagon of the invention.

FIG. 6 shows a further embodiment of a mixer wagon 1 of the invention which, except for the design of the actuating means 17 for moving the slide 13, is identical with the embodiment of FIGS. 1 to 5, so that identical or comparable components are marked with the same reference numerals and are not explained once again.

The actuating means of FIG. 6 has a single piston-cylinder unit 19 which is also arranged such that its direction of actuation follows the larger inclination angle β. The piston-cylinder unit 19 is also arranged next to the slide 13 and substantially in parallel with guide 15b and 15a, respectively. The unit 19 acts on a lever system with a pivot rod 20 that is pivotably supported about a pivot axis 21 extending in vertical direction relative to the curved portion 11b such that unit 19 can engage one of the arms 20a thereof and the other arm 20b thereof acts via a pivotable intermediate piece 22 on or near the lower edge 14 of the slide 13. However, an action on or in the vicinity of the upper edge 16 is also possible. When the unit 19 is retracted, the slide 13 is displaced in the guides 15a, 15b upwards along the opening and closing path P which also extends in this embodiment at inclination angle β.

In a modification of the above described and illustrated embodiment, other suitable actuating means may be provided that are suited for shifting the slide upwards. The shape of the flattening may also be changed, just like the shape of the container. Finally, the opening and closing path may also extend at a larger inclination angle than the wall on the discharge opening; a slightly smaller angle is also possible as long as the slide cannot be opened entirely.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A mixer wagon comprising:
   a mixing chamber having a bottom, a fill opening larger than the bottom, and a wall;
   a work tool in the mixing chamber for sweeping over a work area (A) on the bottom;
   the wall having a flattening at its side having a curved portion and the flattening having a discharge opening;

a slide for closing the flattening discharge opening that is movable by an actuating means in an opening and closing path (P) wherein:

the flattening encloses the mixing chamber bottom with a first inclination angle that is smaller than a second larger inclination angle enclosed by the curved portion with the bottom, and in the vicinity of the mixing chamber bottom, the slide and the curved portion of the wall of the flattening discharge opening follow the shape of the circumference of the work area, and the opening and closing path (P) extends at an angle that is substantially equal to or larger than the larger inclination angle.

2. The mixer wagon according to claim 1 wherein the actuating means comprises at least one piston-cylinder unit whose actuation direction extends along the larger inclination angle.

3. The mixer wagon according to claim 2 wherein the piston-cylinder unit is arranged next to the flattening discharge opening on the curved portion of the wall.

4. The mixer wagon according to claim 2 further comprising two jointly operable piston-cylinder units are provided that act on the slide.

5. The mixer wagon according to claim 4, wherein the piston units comprise a master-slave cylinder set.

6. The mixer wagon according to claim 2 wherein a piston-cylinder unit acts on the slide via a transmission means.

7. The mixer wagon according to claim 6, wherein the transmission means comprises a rod which is pivotable about an axis and includes two arms, one arm acting on the slide and the other arm being connected to the piston-cylinder unit.

8. The mixer wagon according to claim 1 wherein the flattening extends substantially at a right angle relative to the mixing chamber bottom.

9. The mixer wagon according to claim 1 wherein the flattening begins substantially at a point at the mixing chamber bottom and is enlarged towards the mixing chamber fill opening.

10. The mixer wagon according to claim 1 wherein the slide includes a part of the flattening and of the curved portion.

11. The mixer wagon according to claim 1 wherein the slide substantially follows the shape of the wall.

12. The mixer wagon according to claim 1 wherein the slide is symmetrical with respect to the flattening.

13. The mixer wagon according to claim 1 wherein the slide comprises side edges accommodated in guides extending in parallel with the opening and closing path P.

14. The mixer wagon according to claim 1 wherein the opening and closing path P extends essentially from the top to the bottom of the mixing chamber.

* * * * *